(12) United States Patent
Suh et al.

(10) Patent No.: US 8,926,777 B2
(45) Date of Patent: Jan. 6, 2015

(54) METHOD FOR MANUFACTURING HIGH BRIGHTNESS OPTICAL SHEET

(71) Applicant: SKC Haas Display Films Co., Ltd., Chungchongnam-Do (KR)

(72) Inventors: Myung Duck Suh, Chungcheongnam-do (KR); Hyun Doo Lee, Chungcheongnam-do (KR); Sang Hun Lee, Chungcheongbuk-do (KR); Kyoung-IL Lee, Chungcheongnam-do (KR); Jong Sun Yoon, Chungcheongnam-do (KR)

(73) Assignee: SKC Haas Display Films Co., Ltd. (KR)

( * ) Notice: Subject to any disclaimer, the term of this patent is extended or adjusted under 35 U.S.C. 154(b) by 216 days.

(21) Appl. No.: 13/629,570

(22) Filed: Sep. 27, 2012

(65) Prior Publication Data
US 2013/0078425 A1  Mar. 28, 2013

(30) Foreign Application Priority Data
Sep. 27, 2011  (KR) .................. 10-2011-0097234

(51) Int. Cl.
B29C 59/02  (2006.01)
(Continued)

(52) U.S. Cl.
CPC . B32B 5/16 (2013.01); B32B 38/06 (2013.01); G02B 5/0221 (2013.01);
(Continued)

(58) Field of Classification Search
CPC .... H01L 21/6835; B29C 59/00; B29C 59/02; B29C 59/022; B29C 2059/023; B32B 5/16; B32B 7/06; B32B 2037/406; B32B 38/06; B32B 2038/0076; G02C 5/0221

USPC ................... 156/247; 264/109, 119
See application file for complete search history.

(56) References Cited

U.S. PATENT DOCUMENTS 3,989,775 A  *  11/1976  Jack et al. ............... 264/1.9
(Continued)

FOREIGN PATENT DOCUMENTS

JP        54163967 A  *  12/1979
(Continued)

OTHER PUBLICATIONS

English Abstract of JP 54-163967 (Sep. 29, 2014).*
(Continued)

*Primary Examiner* — Sing P Chan
(74) *Attorney, Agent, or Firm* — Cantor Colburn LLP

(57) ABSTRACT

The present invention relates to a method for preparing an optical sheet comprising the steps of: (a) preparing a transfer film having a single roughened side by coating one side of a first substrate with resin component comprising 100 parts by weight of binder resin and 70 to 130 parts by weight of spherical organic polymer beads, followed by drying; (b) laminating the transfer film preparing in step (a) with an ultraviolet-curable (UV-curable) resin-coated layer, which prepared by coating one side of a second substrate with UV-curable resin, such that the roughened side of the transfer film is facing the UV-curable resin-coated side of the second substrate; and (c) forming a roughened diffusive layer on the single-side of the second substrate having refractive index of 1.41 to 1.59 by curing the laminate obtained in step (b), followed by separating and removing the transfer film, wherein the roughened side of the transfer film has a segment angle of 130 to 150°. The optical sheet prepared by the method of the present invention has high brightness, which can also provide masking of prism sheet pattern, and is safe from surface stains and interface scratches between the sheet and the polarizing plate positioned underneath, thus, can be used as an optical sheet in backlight unit of LCD.

3 Claims, 2 Drawing Sheets

(51) Int. Cl.
    *B29C 65/52*                  (2006.01)
    *B32B 37/26*                  (2006.01)
    *B32B 38/06*                  (2006.01)
    *B32B 5/16*                    (2006.01)
    *G02B 5/02*                    (2006.01)
    *B32B 37/24*                  (2006.01)
    *B32B 38/00*                  (2006.01)

(52) U.S. Cl.
    *B32B 2037/243* (2013.01); *B32B 2038/0076* (2013.01); *B32B 2307/406* (2013.01)
    USPC .............. 156/247; 264/119 CPC ..............

(56) References Cited

U.S. PATENT DOCUMENTS

| | | | | |
|---|---|---|---|---|
| 4,075,049 A * | 2/1978 | Wood | ............................ | 156/220 |
| 4,272,564 A * | 6/1981 | Grewe et al. | ................ | 427/163.4 |
| 5,620,775 A * | 4/1997 | LaPerre | ........................ | 428/149 |
| 5,812,316 A * | 9/1998 | Ochi et al. | ..................... | 359/530 |
| 6,054,208 A * | 4/2000 | Rega et al. | ..................... | 428/323 |
| 6,064,524 A * | 5/2000 | Oka et al. | ........................ | 359/582 |
| 6,156,436 A * | 12/2000 | Joseph et al. | ............... | 428/424.4 |
| 6,340,404 B1 * | 1/2002 | Oka et al. | ........................ | 156/230 |
| 6,586,067 B2 * | 7/2003 | Levenstein | ................... | 428/40.1 |
| 6,592,700 B2 * | 7/2003 | Wang et al. | ..................... | 156/235 |
| 6,656,567 B1 * | 12/2003 | Abe et al. | ........................ | 428/141 |
| 6,696,140 B2 * | 2/2004 | Suzuki | ........................... | 428/212 |
| 6,844,047 B2 * | 1/2005 | Kaminsky et al. | ............ | 428/141 |
| 6,888,663 B2 * | 5/2005 | Bourdelais et al. | ............ | 359/296 |
| 7,008,066 B2 * | 3/2006 | Suga et al. | ..................... | 359/603 |
| 7,033,638 B2 * | 4/2006 | Suzuki | ........................... | 427/162 |
| 7,132,136 B2 * | 11/2006 | Laney et al. | .................... | 428/1.1 |
| 7,238,644 B2 * | 7/2007 | Yukawa et al. | ................. | 503/227 |
| 7,327,415 B2 * | 2/2008 | Brickey et al. | ................. | 349/64 |
| 7,604,381 B2 * | 10/2009 | Hebrink et al. | ................ | 362/317 |
| 7,661,832 B2 * | 2/2010 | Iwata et al. | ..................... | 359/601 |
| 7,982,380 B2 * | 7/2011 | Kamiyama et al. | ........... | 313/111 |
| 8,033,706 B1 * | 10/2011 | Kelly et al. | ..................... | 362/607 |
| 8,619,363 B1 * | 12/2013 | Coleman | ........................ | 359/576 |
| 8,684,544 B2 * | 4/2014 | Kobayashi et al. | ........... | 359/536 |
| 2002/0150722 A1 * | 10/2002 | Suzuki | ........................... | 428/141 |
| 2003/0003254 A1 * | 1/2003 | Levenstein | ................... | 428/40.1 |
| 2003/0039758 A1 * | 2/2003 | Wang et al. | ..................... | 427/402 |
| 2004/0150874 A1 * | 8/2004 | Suzuki | ........................... | 359/332 |
| 2006/0159902 A1 * | 7/2006 | Suzuki | ........................... | 428/212 |
| 2008/0252980 A1 * | 10/2008 | Hebrink et al. | ................ | 359/599 |
| 2009/0052043 A1 * | 2/2009 | Iwata et al. | ..................... | 359/601 |
| 2010/0173132 A1 * | 7/2010 | Furukawa | ..................... | 428/172 |
| 2011/0038048 A1 * | 2/2011 | Kobayashi et al. | ........... | 359/537 |
| 2011/0058257 A1 * | 3/2011 | Lin et al. | ........................ | 359/599 |
| 2011/0200745 A1 * | 8/2011 | Sugimoto et al. | ............. | 427/195 |
| 2014/0092474 A1 * | 4/2014 | Kobayashi et al. | ........... | 359/537 |
| 2014/0169036 A1 * | 6/2014 | Lee et al. | ....................... | 362/612 |

FOREIGN PATENT DOCUMENTS

| | | | |
|---|---|---|---|
| JP | 08267694 | A * | 10/1996 |
| JP | 2008238601 | A * | 10/2008 |
| JP | 2013073239 | A * | 4/2013 |

OTHER PUBLICATIONS

English Abstract of JP 08-267694 (Sep. 29, 2014).*
English Abstract of JP 2008-238601 (Sep. 29, 2014).*
English Abstract of JP 2013-073239 (Sep. 29, 2014).*

* cited by examiner (a)  (b)

METHOD FOR MANUFACTURING HIGH BRIGHTNESS OPTICAL SHEET

FIELD OF THE INVENTION

The present invention relates to a method for manufacturing a high brightness optical sheet comprising an embossed diffusive layer formed by a transfer film having an embossed surface due to the presence of organic polymer beads.

BACKGROUND OF THE INVENTION

A liquid crystal display (LCD) has broadened their applications as our society has changed to an information society and the technology has developed. In recent years, there have been increasing demands for LCDs with light weight, slim design, and low electrical power consumption.

Recently, a light emitting diode (LED) is mainly used for a light source of a backlight unit (BLU) owing to its high brightness and long life span. For an edge-lit backlight unit, however, a fewer number of LEDs are employed in order to resolve the problems of high cost and heat release. Further, a dual brightness enhancement film (DBEF) sheet tends not to be employed as a reflective polarization film above a prism for reducing the manufacturing cost.

As a result, there has been a demand for a high performance optical sheet having improved brightness suitable for use as an optical film as well as high diffusivity for hiding the pattern of a prism sheet.

Korean Laid-open Patent Publication No. 2010-0042310 discloses a light diffusion film with high quality luminance, which has enhanced brightness by adjusting the shape and rate of protrusions of a hemisphere lens. However, the light diffusion film has possible risks of interfacial scratch as well as surface stain defects due to vibration friction of the protrusions when they are in contact with a polarizing plate.

Further, Japanese Laid-open Patent Publication No. 2000-193805 discloses a light diffusive sheet, which provides uniform light diffusion although it does not employ spherical beads. The light diffusion sheet, however, has unsatisfactory optical properties in terms of brightness, hiding power, viewing angle, and the like.

Thus, there is a need to provide a method for manufacturing an optical sheet that can resolve the aforementioned problems.

DISCLOSURE OF THE INVENTION

Problems to be Solved by the Invention

Accordingly, it is an object of the present invention to provide a method for manufacturing an optical sheet having improved brightness as well as high diffusivity for hiding the pattern of a prism sheet, wherein the optical sheet contains no beads and is free from interfacial scratch and surface stain defects even when it is in contact with a polarizing plate.

Means for Solving the Problem

In order to achieve the above-mentioned objective, the present invention provides a method for manufacturing an optical sheet, comprising the steps of (a) coating one side of a first substrate with a resin composition comprising 100 parts by weight of a binder resin and 70 to 130 parts by weight of spherical organic polymer beads, followed by drying, to prepare a transfer film having an embossed surface; (b) coating one side of a second substrate with an ultraviolet-curable (UV-curable) resin and laminating the transfer film with the second substrate to provide a laminate wherein the embossed surface of the transfer film is in contact with the UV-curable resin coating of the second substrate; and (c) curing the laminate obtained in step (b) and removing the transfer film from the laminate such that the second substrate has an embossed diffusive layer having a refractive index of 1.41 to 1.59.

The embossed surface of the transfer film has a segment angle of 130 to 150°.

Also, the present invention provides an optical sheet prepared in accordance with the inventive method, comprising a substrate and an embossed diffusive layer formed on the substrate and having a refractive index of 1.41 to 1.59.

Effect of the Invention

The optical sheet prepared in accordance with the method of the present invention is useful as an optical sheet for a BLU of an LCD since it has improved brightness as well as high diffusivity for hiding the pattern of a prism sheet. Further, it contains no beads and is free from interfacial scratch and surface stain defects even when it is in contact with a polarizing plate.

DETAILED DESCRIPTION OF THE INVENTION

The method for manufacturing an optical sheet according to the present invention comprises the steps of (a) coating one side of a first substrate with a resin composition comprising a binder resin and spherical organic polymer beads, followed by drying, to prepare a transfer film having an embossed surface; (b) coating one side of a second substrate with a UV-curable resin and laminating the transfer film with the second substrate to provide a laminate wherein the embossed surface of the transfer film is in contact with the UV-curable resin coating of the second substrate; and (c) curing the laminate obtained in step (b) and removing the transfer film from the laminate such that the second substrate has an embossed diffusive layer.

In other words, according to the method for manufacturing an optical sheet of the present invention, a transfer film having an embossed surface is laminated with a substrate having a UV-curable resin coating, the UV-curable resin coating of the substrate is cured, and the transfer film is removed, whereby the embossed surface of the transfer film is transferred to the UV-curable resin coating layer of the substrate. The optical sheet comprises an embossed diffusive layer formed on the substrate although it contains no beads and fillers.

Step (a): Preparation of a Transfer Film

According to the method of the present invention, a transfer film having an embossed surface is prepared by coating one side of a first substrate with a resin composition comprising a binder resin and spherical organic polymer beads, followed by drying thereof.

Since the resin composition containing the beads is coated onto one side of the first substrate, the first substrate will have an embossed surface, wherein the embossed surface may have a segment angle of 130 to 150°.

In case that an embossed surface comprises separate hemisphere-shaped protrusions, e.g., micro lens, the boundaries of the protrusions are distinct so that the height of each protrusion can readily be measured. On the other hand, if an embossed surface is in the form of a coating layer, the boundaries of the protrusions are not distinct, which makes it difficult to measure the height of each protrusion. Therefore, the segment angle is defined herein as the angle formed by the peaks of two adjacent protrusions and the nadir between the protrusions, with the nadir being the vertex of the angle.

Figure 1:
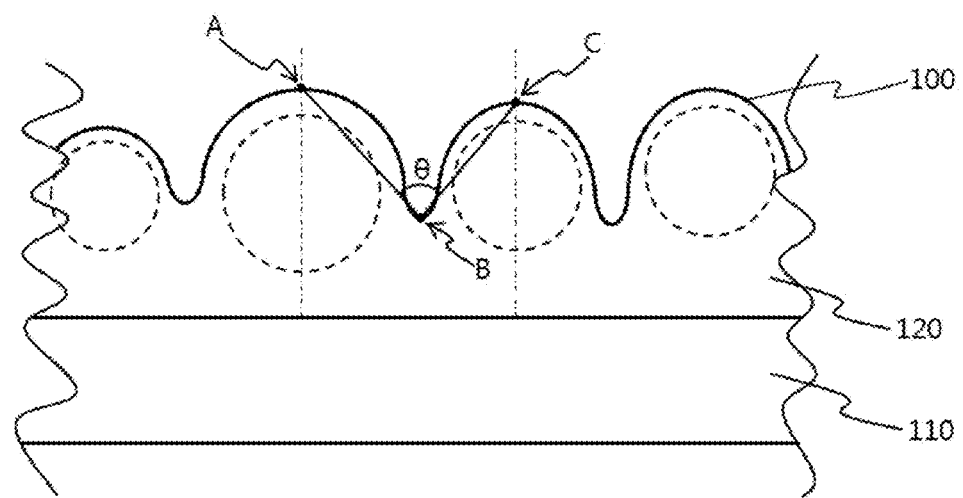
FIG. 1 is a schematic view for demonstrating the segment angle in accordance with the present invention.

FIG. 1 of the present invention shows a schematic view for demonstrating the segment angle in accordance with the present invention. Referring to FIG. 1, when a coating layer (120) comprising a binder resin and beads is formed on one side of a first substrate (110), the segment angle (A) is defined as the angle ABC (A) formed by the two lines connecting the apexes (A, C) of the protrusions and the nadir (B) located in the lower boundary between said protrusions.

The first substrate may be a transparent plastic sheet, preferably having good adhesion with the binder resin.

Representative examples of the transparent plastic employable for the first substrate include polyether sulfone (PES), polyacrylate (PAR), polyetherimide (PEI), polyethylene naphthalate (PEN), polyethylene terephthalate (PET), polyphenylene sulfide (PPS), polyallylate, polyimide, polycarbonate (PC), cellulose triacetate (TAC), and cellulose acetate propionate (CAP); preferably polyethylene terephthalate (PET).

The resin composition comprises organic polymer beads in an amount of 70 to 130 parts by weight, based on 100 parts by weight of the binder resin. The organic polymer beads and the binder resin are admixed with a solvent.

If the amount of the beads is less than 70 parts by weight, the total light transmittance of the optical sheet prepared by the inventive method would increase; however, the haze of the optical sheet may be less than 85%, impairing its diffusivity. In such case, the optical sheet may have poor hiding power.

On the other hand, if the amount of the beads is greater than 130 parts by weight, the haze of the optical sheet would increase; however, the total light transmittance may be less than 85%. In such case, the optical sheet may have stain defects on its surface as well as reduced brightness.

It is preferable that the binder resin has high transparency with good light transmittance and that the viscosity of the binder resin is readily controllable for convenience in coating operation. Representative examples of the binder resin include acrylic-based, urethane-based, epoxy-based, vinyl-based, polyester-based, and polyamide-based resins. An acrylic-based resin is preferred owing to its good abrasion resistance as well as excellent reflectance and transmittance of light with proper light refractivity. Specific examples of the acrylic-based resin include a homopolymer with a repeating unit and a copolymer with two or more repeating units wherein the repeating unit is selected from methylmethacryl, methacrylethylacryl, butylacryl, arylacryl, hexylacryl, isopropylmethacryl, benzylacryl, vinylacryl, 2-methoxyacryl, and styrene. The acrylic-based resin may be heat curable or UV curable. It may be chosen depending on its solubility in a solvent. It is also possible to achieve desirable capability of coating and mechanical properties and durability of a coating layer, and adhesion with a substrate by way of controlling the molecular weights, glass transition temperature (Tg), and degree of hydroxyl groups of the acrylic-based resin.

The spherical organic polymer beads may be made of such organic polymers as hard acrylate, polystyrene, nylon, soft acrylate, or silicone. Hard acrylate is preferred since it is readily dispersible due to its good solution resistant property.

The average diameter of the beads may be 0.1 to 50 μm, preferably 5 to 12 μm. If the average diameter is less than 0.1 μm, the beads will be embedded in the coating layer of the resin composition. In such case, the protruding area on the surface may not be sufficient, resulting in an optical sheet with poor hiding power. On the other hand, if the average diameter is greater than 50 μm, it is likely that the optical sheet may have stain defects on its surface or that the excessive protrusions on the surface of the optical sheet may cause scratch on the polarizing plate underlying the optical sheet.

The transfer film having an embossed surface can be prepared by coating one side of the first substrate with the resin composition in an amount of 6.0 to 12.0 g/m$^2$, followed by drying thereof.

If the coating amount is less than 6.0 g/m$^2$, the protrusions on the surface of the coating layer may not be projected sufficiently. In such case, the segment angle may be small, resulting in an optical sheet with less brightness. On the other hand, if the coating amount is greater than 12.0 g/m$^2$, the light transmittance of the optical sheet may deteriorate. Thus, the optical sheet may not be capable of providing high brightness when employed in a BLU of an LCD.

If the embossed surface of the transfer film is treated with a releasing agent, it may be easily removed from a laminate in a later step. The releasing agent may be any conventional releasing agent known in the art, e.g., a silicone releasing agent.

Step (b): Formation of a Laminate

Next, one side of a second substrate is coated with a UV-curable resin, followed by lamination of the transfer film prepared in step (a) with the UV-curable resin coating layer such that the embossed surface of the transfer film is in contact with the UV-curable resin coating of the second substrate.

The second substrate can be a transparent plastic sheet, preferably having good adhesion with the UV-curable resin, a transmittance of 90% or more of the light incident upon the backside thereof, and a smooth surface for preventing brightness variation.

Representative examples of the transparent plastic employable for the second substrate may be the same as those listed for the first substrate, preferably polyethylene terephthalate (PET).

The thickness of the second substrate may be 10 to 300 μm. If thickness is less than 10 μm, it may be inconvenient to handle the substrate. If the thickness is greater than 300 μm, it cannot afford to produce a thin LCD module.

Representative examples of the UV-curable resin include a polyester-based resin, an epoxy-based resin, and a (meth) acrylate resin such as polyester (meth)acrylate, epoxy (meth) acrylate, urethane (meth)acrylate, and the like. Especially, a (meth)acrylate resin, an unsaturated polyester resin, a polyester (meth)acrylate resin, a silicone urethane (meth)acrylate resin, a silicone polyester (meth)acrylate resin, and a fluorourethane (meth)acrylate resin are preferred for the good optical properties of the optical sheet.

The UV-curable resin can be prepared from polyacrylate and/or polymethacrylate (hereinafter, poly(meth)acrylate), or monoacrylate and/or monomethacrylate (hereinafter, mono (meth)acrylate) and a photopolymerization initiator.

The thickness of the UV-curable resin coating layer may be 1 to 50 μm, preferably 1 to 15 μm. If the thickness is less than 1 μm, it may be difficult to retain the shape of the laminate or it may cause such defects as a moire pattern and poor appearance. If the thickness is greater than 50 μm, the marginal layer between the protrusions and the substrate may be thick, resulting in a waver pattern due to its heat and moisture resistance.

An anti-blocking layer may be formed on the other side of the second substrate by coating the substrate with a composition comprising a filler selected from inorganic particles such as silica or organic particles such as acryl crosslinked particles having a diameter of 0.1 to 50 μm, and a binder resin, and then drying the coated layer.

The anti-blocking layer may further comprise an anti-static agent, which prevents contamination of the layer with dust or foreign materials due to the electrostatic of the substrate.

Step (c): Formation of a Diffusive Layer

Figure 3:
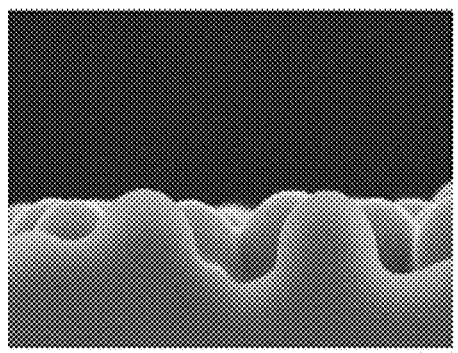
FIG. 3 illustrates a cross-sectional view (a) and a surface view (b) of the embossed diffusive layer of the optical sheet prepared in accordance with the present invention.
Figure 3:
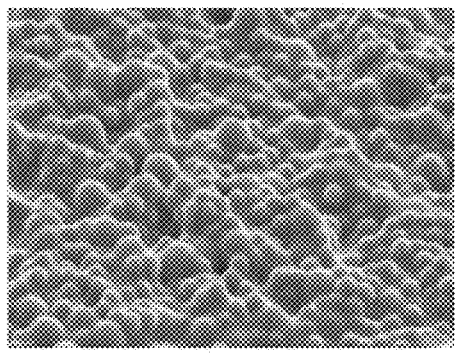

Lastly, the laminate obtained in the step (b) is cured and the transfer film is then removed therefrom to thereby provide an embossed diffusive layer on one side of the second substrate. FIG. 3 represents pictures showing a cross-sectional view (a) and a surface view (b) of the embossed diffusive layer.

The embossed diffusive layer may have a refractive index of 1.41 to 1.59. If the refractive index is lower than 1.41, the optical diffusivity of the diffusive layer may deteriorate, thereby reducing the hiding power of the optical sheet. If the refractive index exceeds 1.59, the total light transmittance of the diffusive layer may decrease, thereby reducing the brightness of the optical sheet.

Since the embossed surface of the transfer film is transferred to the diffusive layer, the diffusive layer has high brightness although it contains no beads or fillers.

Inasmuch as the embossed surface of the transfer film is transferred to the diffusive layer, it is crucial to control the segment angle in the embossed surface of the transfer film in the range of 130 to 150° for imparting good optical properties to the optical sheet.

If the segment angle is less than 130°, the protrusions formed on the diffusive layer may have a substantially hemispherical shape with a protrusion rate of about 50%. In such case, the ability of light to pass straight through the embossed surface may be reduced. Further, the total light reflection at the interface between the embossed diffusive layer and the outside may increase, thereby giving rise to undesirable reduction in the brightness of the optical sheet (with increase in the efficiency of light recycle). If the segment angle exceeds 150°, the diffusion of light transmitted through the protrusions formed on the diffusive layer may decrease, which may undesirably impair the hiding power of the optical sheet.

Figure 2:
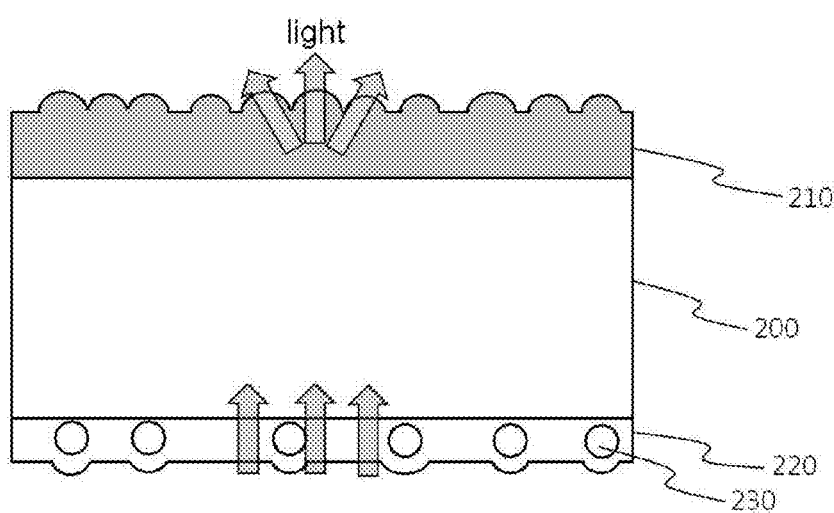
FIG. 2 is a schematic cross-sectional view of the optical sheet prepared in accordance with the present invention.

FIG. 2 shows a schematic cross-sectional view of the optical sheet prepared in accordance with the method of the present invention. Referring to FIG. 2, the optical sheet prepared in accordance with the method of the present invention may comprise an embossed diffusive layer (210) formed on one side of the second substrate (200) and an anti-blocking layer (220) on the other side of the second substrate (200). Also, it may comprise fillers (230) in the anti-blocking layer (220).

In other words, according to the method of the present invention, an optical sheet having an embossed diffusive layer formed on one side of a second substrate and containing no beads or fillers can be manufactured by the method comprising preparing a transfer film with an embossed surface, laminating the transfer film with a second substrate having a UV-curable resin coating, curing the UV-curable resin coating layer, and removing the transfer film from the laminate, whereby the embossed surface of the transfer film is transferred onto the UV-curable resin coating layer of the second substrate. The optical sheet manufactured preferably has a haze of 85% or more and a total light transmittance of 85% or more.

The present invention is further described and illustrated in Examples and Comparative Examples, which, however, are not intended to limit the scope of the present invention.

The properties of the optical sheets prepared according to the Examples and Comparative Examples, including refractive index of the UV-curable resin coating layer and haze (%), total light transmittance (Tt) (%), brightness (%), hiding power, interfacial scratch, and appearance of the optical sheet, were evaluated as below.

1. Refractive Index of UV-Curable Resin Coating Layer (Embossed Diffusive Layer)

The refractive index was measured by a conventional method.

2. Haze (%) and Total Light Transmittance (%)

Generally, the haze and total light transmittance of the optical sheet can be measured as follows:

Haze (%)=diffusive transmittance (DT)/total transmittance (TT)

Total transmittance (TT)=parallel transmittance (PT)+ diffusive transmittance (DT)

Total light transmittance (%)=total transmittance (TT)/total incident light

The haze and total light transmittance were measured by a hazemeter NDH-2000 (Denshikogyo, Japan).

3. Hiding Power

The hiding power of the optical sheet was evaluated by a 5-point grading system. Two prism sheets were crossly (V, H) laminated on a light guide panel having a dot pattern, and samples were prepared with various Hz values of the top sheet. The hiding power was assessed from grade 2 applicable for commercial production up to grade 5 indicating complete masking of bright lines or dots depending on the visibility of the bright line spots.

4. Brightness

The viewing angle of the optical sheet was evaluated with the same backlight unit structure as that used in the evaluation of hiding power. A luminance calorimeter BM7 (Topcon) was used to measure the viewing angle while the light receiving part was rotated in horizontal direction from −85° to +85° at a 5° increment. The value measured at 0°, i.e., when the light receiving part is perpendicular to the backlight unit, was referred to as brightness of the sample. A conventional optical sheet commonly used over a prism (e.g., the transfer film employed in Comparative Example 9) served as a reference for the evaluation of brightness. Brightness equal to or better than that of the reference was deemed satisfactory.

5. Interfacial Scratch

Interfacial scratch that may be caused as the space between a diffusive layer and a polarizing plate has been reduced was evaluated by a Heidon Surface Property Tester Type 14FW (Shinto Scientific) as the degree of scratch at the interface between a clear polarizer and a diffusive layer. The degree of scratch was measured as a function of the number of movements under the conditions of a speed of 1 Hz, an amplitude of 40 mm, and a load of 200 g. If the interface was not damaged after 10 movements, it was deemed satisfactory.

6. Appearance

The appearance of the optical sheet was observed with naked eyes for checking such defects as wet-out, flow stain, lumping, stripe, flow mark, and stain.

Meanwhile, a picture (50*150x) of the surface was taken by an optical microscope model VK-9700K (Keyence Corporation), and the segment angle was measured by a VK analyzer S/W (Keyence Corporation) based on the picture. Lines were drawn between the peaks of 20 adjacent protrusions, and the angles formed by the peaks of two adjacent protrusions and the nadir between the protrusions were measured. The average of the angles was taken as the segment angle.

Example 1

100 parts by weight of hard acrylate beads having an average diameter of 10 μm and 100 parts by weight of an acryl binder resin (A811, AeKyung Chemical) were mixed with a mixed solvent of methyl ethyl ketone and toluene (2:1 by weight) to yield a solid concentration of 30%. The resulting dispersion was stirred in a mixer equipped with a high performance motor at 1,000 rpm for 1 hour to obtain a resin composition wherein the beads were thoroughly dispersed in the resin. The resin composition was coated with wire bar No. 12 on a polyethylene terephthalate (PET) film having a thickness of 188 μm (SH40, SKC). The solvent was allowed to evaporate for 120 seconds in a convection oven at 100° C. to produce a transfer film having a resin composition coating layer of 10 μm in thickness and a segment angle of 133°. The transfer film was subjected to release treatment for easy removal thereof from a UV-cured resin layer in the final step of the preparation of an optical sheet.

Next, an uncured UV-curable resin (M110 SKC Haas Display Film Co., Ltd.) having a refractive index of 1.49 in solid phase was applied on a PET film having a thickness of 110 μm. The resulting film was laminated with the transfer film such that the embossed surface of the transfer film was in contact with the UV-curable resin coating layer such that the embossed shape of the transfer film was transferred onto the UV-curable resin coating layer. Then, laminate was exposed to UV radiation such that the UV-curable coating layer was cured. Finally, the transfer film was removed from the laminate to obtain an optical sheet having an embossed diffusive layer formed on one side of the PET film.

Example 2

The procedure of Example 1 was repeated except that 110 parts by weight of hard acrylate beads having an average diameter of 5.5 μm were employed based on 100 parts by weight of the binder resin such that a transfer film with a segment angle of 135° was prepared.

Example 3

The procedure of Example 1 was repeated except that 120 parts by weight of hard acrylate beads having an average diameter of 5.5 μm were employed based on 100 parts by weight of the binder resin such that a transfer film with a segment angle of 145° was prepared.

Example 4

The procedure of Example 1 was repeated except that 110 parts by weight of hard acrylate beads having an average diameter of 11.5 μm were employed based on 100 parts by weight of the binder resin such that a transfer film with a segment angle of 135° was prepared.

Example 5

The procedure of Example 1 was repeated except that 115 parts by weight of hard acrylate beads having an average diameter of 11.5 μm were employed based on 100 parts by weight of the binder resin such that a transfer film with a segment angle of 145° was prepared.

Example 6

The procedure of Example 1 was repeated except that hard acrylate beads having an average diameter of 8 μm were employed such that a transfer film with a segment angle of 140° was prepared.

Comparative Example 1

The procedure of Example 1 was repeated except that hard acrylate beads having an average diameter of 4.5 μm were employed such that a transfer film with a segment angle of 155° was prepared.

Comparative Example 2

The procedure of Example 1 was repeated except that hard acrylate beads having an average diameter of 12.5 μm were employed such that a transfer film with a segment angle of 125° was prepared.

Comparative Example 3

The procedure of Example 1 was repeated except that hard acrylate beads having an average diameter of 4.5 μm were employed such that a transfer film with a segment angle of 125° was prepared.

Comparative Example 4

The procedure of Example 1 was repeated except that hard acrylate beads having an average diameter of 12.5 μm were employed such that a transfer film with a segment angle of 160° was prepared.

Comparative Example 5

The procedure of Example 1 was repeated except that an uncured UV-curable resin (M205 SKC Haas Display Film Co., Ltd.) having a refractive index of 1.40 in solid phase was employed.

Comparative Example 6

The procedure of Example 1 was repeated except that an uncured UV-curable resin (M301 SKC Haas Display Film Co., Ltd.) having a refractive index of 1.60 in solid phase was employed.

Comparative Example 7

The procedure of Example 1 was repeated except that 65 parts by weight of the beads were employed based on 100 parts by weight of the binder resin.

Comparative Example 8

The procedure of Example 1 was repeated except that 135 parts by weight of the beads were employed based on 100 parts by weight of the binder resin.

Comparative Example 9

The transfer film prepared in Example 1 was used as an optical sheet.

TABLE 1

Preparation conditions and properties of optical sheets using transfer film

| | Prep. condition | | | Refr. Index | Haze (%) | TT (%) | BRT (%) | Hiding power | Int. Scr. | Exterior Appearance |
|---|---|---|---|---|---|---|---|---|---|---|
| | A* | B* | C* | | | | | | | |
| Ex. 1 | 100 | 10 | 133 | 1.49 | 88.3 | 91.0 | 101.9 | OK(2) | OK | Good |
| Ex. 2 | 110 | 5.5 | 135 | 1.49 | 88.0 | 91.4 | 102.0 | OK(2) | OK | Good |
| Ex. 3 | 120 | 5.5 | 145 | 1.49 | 87.7 | 92.1 | 102.1 | OK(2) | OK | Good |
| Ex. 4 | 110 | 11.5 | 135 | 1.49 | 88.6 | 89.9 | 101.7 | OK(2) | OK | Good |
| Ex. 5 | 115 | 11.5 | 145 | 1.49 | 88.2 | 91.3 | 101.8 | OK(2) | OK | Good |
| Ex. 6 | 100 | 8 | 140 | 1.49 | 88.2 | 91.1 | 102.0 | OK(2) | OK | Good |
| Co.Ex. 1 | 100 | 4.5 | 155 | 1.49 | 83.0 | 94.0 | 104.0 | NG(5) | NG | Wet-out, flow stain |
| Co.Ex. 2 | 100 | 12.5 | 125 | 1.49 | 92.0 | 88.3 | 98.0 | OK(2) | OK | Lumping, stripe |
| Co.Ex. 3 | 100 | 4.5 | 125 | 1.49 | 85.0 | 89.0 | 98.5 | OK(2) | OK | — |
| Co.Ex. 4 | 100 | 12.5 | 160 | 1.49 | 86.0 | 93.0 | 103.5 | OK(2) | OK | Mura |
| Co.Ex. 5 | 100 | 10 | 133 | 1.40 | 83.6 | 92.8 | 103.9 | NG(3) | OK | — |
| Co.Ex. 6 | 100 | 10 | 133 | 1.60 | 89.2 | 84.8 | 97.8 | OK(2) | OK | — |
| Co.Ex. 7 | 65 | 10 | 133 | 1.49 | 76.2 | 94.2 | 106.7 | NG(5) | NG | Flow mark |
| Co.Ex. 8 | 135 | 10 | 133 | 1.49 | 93.7 | 82.4 | 98.3 | OK(2) | NG | Lumping, stain |
| Co.Ex. 9 | 100 | 10 | 133 | 1.49 | 89.2 | 90.1 | 100.0 | OK(2) | NG | Good |

A* = Parts by weight of beads (%)
B* = Diameter of beads (μm)
C* = Segment angle (°)
Refr. Index = refractive index of UV-curable resin
BRT = Brightness
Int. Scr. = Interfacial scratch As shown in Examples 1 to 6, the optical sheets prepared according to the present invention showed a haze of at least 85%, a total light transmittance of at least 85%, and a brightness of at least 100%, together with good appearance, hiding power, and was free from interfacial scratch.

As shown in Comparative Examples 1 to 4, if the segment angle was not in the range of 130 to 150°, the brightness deteriorated and defective appearance was observed. As shown in Comparative Examples 5 and 6, if the refractive index of the UV-curable resin coating layer was not in the range of 1.41 to 1.59, undesirable brightness, haze and total light transmittance were obtained.

Further, as shown in Comparative Examples of 7 and 8, if the amount of beads employed was not in the range of 70 to 130 parts by weight, based on 100 parts by weight of a binder resin, the hiding power of the optical sheet was impaired, and interfacial scratch was observed.

As compared to the optical sheet prepared by a conventional coating method (Comparative Example 9), the optical sheets of Examples 1 to 6 prepared according to the method of the present invention demonstrated improved brightness in addition to excellent resistance to interfacial scratch.

What is claimed is:

1. A method for preparing an optical sheet comprising the steps of:
    (a) coating one side of a first substrate with a resin composition comprising 100 parts by weight of a binder resin and 70 to 130 parts by weight of spherical organic polymer beads, followed by drying, to prepare a transfer film having an embossed surface;
    (b) coating one side of a second substrate with an ultraviolet-curable (UV-curable) resin and laminating the transfer film with the second substrate to provide a laminate wherein the embossed surface of the transfer film is in contact with the UV-curable resin coating of the second substrate; and
    (c) curing the laminate obtained in step (b) and removing the transfer film from the laminate such that the second substrate has an embossed diffusive layer having a refractive index of 1.41 to 1.59, wherein the embossed surface of the transfer film has a segment angle of 130 to 150 .degree.

2. The method for preparing an optical sheet of claim 1, wherein the average diameter of the organic polymer beads are 5 to 12 .mu.m.

3. The method for preparing an optical sheet of claim 1, wherein the UV-curable resin for the UV-curable resin coating layer comprises a (meth)acrylate resin, an unsaturated polyester resin, a polyester (meth)acrylate resin, a silicone urethane (meth)acrylate resin, a silicone polyester (meth)acrylate resin, a fluorourethane (meth)acrylate resin, or a mixture thereof.

* * * * *